Feb. 11, 1969
G. R. NOLAND
3,426,870
SAFETY BRAKES
Original Filed July 14, 1966
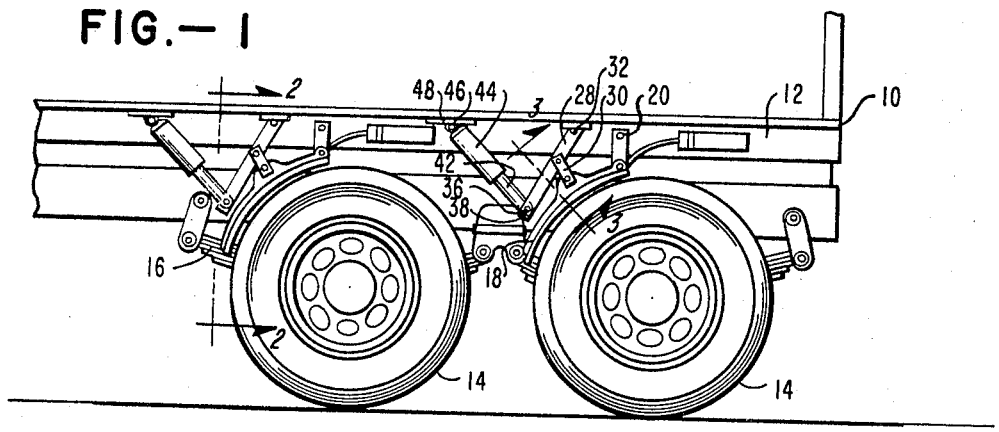
FIG.—1
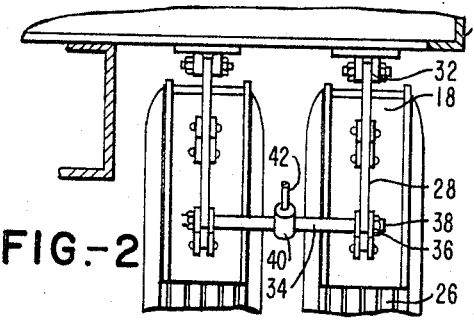
FIG.—2
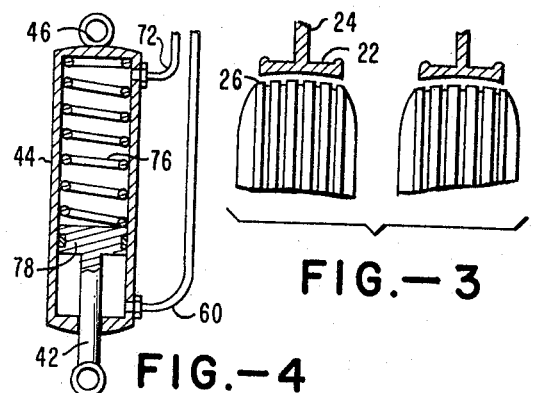
FIG.—3
FIG.—4
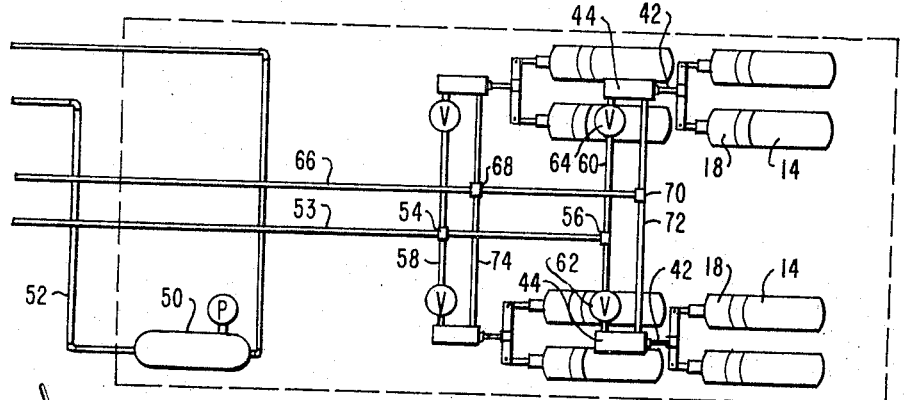
FIG.—5
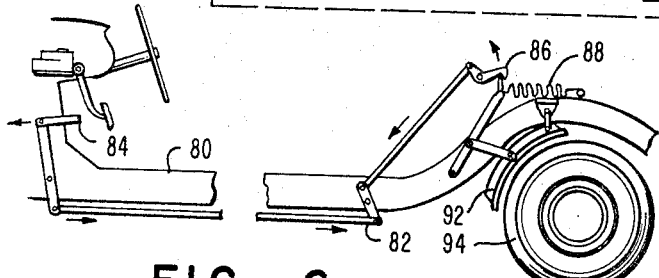
FIG.—6
INVENTOR.
GLOYD R. NOLAND
BY
Sanford Aston
ATTORNEY

United States Patent Office 3,426,870
Patented Feb. 11, 1969

3,426,870
SAFETY BRAKES
Gloyd R. Noland, 22850 Leonora Drive,
Woodland Hills, Calif. 91364
Continuation of application Ser. No. 565,224, July 14, 1966. This application Feb. 26, 1968, Ser. No. 712,328
U.S. Cl. 188—29
Int. Cl. B60t 7/12; F16d 65/24; B61h 11/02
1 Claim

ABSTRACT OF THE DISCLOSURE

The invention relates to an auxiliary brake system for vehicles such as trucks or busses which will be effective to aid the basic brake system, usually air, when it fails. This is accomplished by providing brake shoes adjacent the outer edge of the vehicle tires, pivoted on the vehicle frame to provide a mechanical advantage in braking pressure. The brakes are controlled by the vehicle air system as an auxiliary to the basic brake system and are provided with a safety spring action in case the air system fails.

---

This application is a continuation of application Ser. No. 565,224, filed July 14, 1966, now abandoned.

The present invention relates to an auxiliary brake system for use on vehicles such as trucks or busses and even automobiles, in an emergency. This invention relates more particularly to an auxiliary safety brake system for use on trucks and busses utilizing an air brake system which will be effective when the basic air system fails.

To date no satisfactory safety brake system has been developed for use on trucks and busses, particularly school busses, which will safely and easily stop the bus when the regular air brake system fails due to loss of pressure. Systems have been shown which stop the bus too abruptly, causing injury and which destroy the tires. As a result few busses and trucks, particularly school busses, are equipped with an auxiliary safety brake system even through authorities desire to have such a system on every bus.

It is an object of the present invention to provide a safe auxiliary brake system for trucks and busses.

It is a further object of this invention to provide a safe auxiliary brake system of simple design, which may be easily installed on existing vehicles.

Still a further object of this invention is to provide a safe auxiliary safety brake system which provides equalized braking on the tires, is non-destructive to the tires, and will bring the vehicle to a safe stop.

These and other objects of the invention will be obvious from the following description and the accompanying drawing in which:

FIG. 1 is a fragmentary side elevation of a vehicle of a type which employs dual tandem pneumatic wheels, FIG. 2 is a fragmentary sectional view taken on lines 2—2 of FIG. 1, FIG. 3 is a fragmentary enlarged view taken on lines 3—3 of FIG. 1, FIG. 4 is a cross section view of the piston spring portion of the system of FIG. 1, FIG. 5 is a schematic which diagrammetrically illustrates the pneumatic system of controls, FIG. 6 is a fragmentary side elevation of an automobile which employs the device of the present invention.

Referring now to the drawing there is shown in FIGURES 1 to 3 generally a vehicle 10 (partially shown) including the usual bed or frame 12 above which is a body (not shown) for carrying a load. Bed 12 is provided with rubber tire wheel assemblies, designated generally as 14, mounted on axles which in turn are secured to spring suspension means 16 secured to frame or bed 12. For purposes of illustration only the invention is shown as adaptable to that type of wheel suspension wherein eight rear wheels are arranged in double tandem pairs, as shown in FIG. 5. The brake system of the present invention is adaptable, however, to other wheel suspension arrangements. In addition, the invention is shown as adaptable for braking action on pneumatic tires although it is within the purview of the invention to be used on other types of tires.

Adjacent the forward upper quadrants for each tire wheel assembly is positioned a brake shoe 18. The end of said brake shoe 18 adjacent the bed 12 is secured to a pivot mounting 20 which pivot mounting 20 is fastened to the bed or frame 12. Each brake shoe 18, as particularly shown in FIG. 3, includes a web 22 and a flange 24 positioned intermediate the web width. The web as well as the flange is arcuate circumferentially to conform to the tire tread, the web being contoured transversely to conform to the transverse tire section. Thus, it may be said that the brake shoe has a compound contour.

The flange 24 of each brake shoe is connected to lever 28 by connecting bar 30 and the end of lever 28 adjacent the bed 12 is secured by a swivel mount 32 to bed 12 at a point removed from pivot mounting 20 so as to place brake shoes 18 adjacent tire 14. This placement of lever 28 permits a mechanical advantage as the lower end of lever 28 is moved towards the tire as will be described hereinafter. This mechanical advantage, which in tests conducted amounts to 3 to 1, provides the braking system of the present invention with an unusually good performance in bringing a vehicle to a safe stop without destroying the tires.

The lower end of levers 28 are interconnected by tie bars 34. Ends of the tie bars 34 are provided with mounting means such as clevises 36 carrying pins 38 passed through openings in the lever 28. A clevis 40 is intermediately connected by a pin to the tie bar and clevis 40 is provided with a rod 42, the rod 42 constituting the piston rod received in a cylinder 44. Said cylinder at its inner end 46 is pivotally mounted to a bracket 48 secured to the frame or bed 12. This construction equalizes movements of the brake shoes for each pair of wheels when the piston rods 42 are actuated to swing the brake shoes 18 to engage with the treads of the tires 14.

The cylinder 44 is of the pneumatic type. Thus as shown in FIG. 5 there is provided a reservoir 50 for compressed air. This reservoir through tubing 52 connects with a four-way selector valve (not shown). Tubing 53 for inlet pressure air connects with said valve and through fittings 54 and 56 with tubing 58 and 60 to needle valves such as 62 and 64 for controlling air flow to the cylinders 44 to move the piston arms or rods 42, causing movement of the equilizing tie bars resulting in engagement of the brake shoes 18 against the tread of tires 14.

A return pressure tube 66 connects with the valve (not shown) and through fillings 68 and 70 and tubes 72 and 74 with the forward ends of the cylinders 44 for the purpose of retracting the piston rods 42 within said cylinders to lift the brake shoes from the tire treads when air pressure is directed through said tube 66 and air is returned through tubes 58 and 60, to the valve and thence through a vent to the atmosphere. Normally tubes 58 and 60 are termed inlet tubes and 72 and 74 exhaust tubes, however the air pressure may move in either direction in each case dependent upon the actuation of the brake shoes. The valve is a selector-valve and its position controls movement of the air pressure in either line 53 or 66. The control valves 62 and 64 are of the metering flow type, which are well known in the industry and may control both the inlet speed of the air pressure and the exhaust speed thereof. Valves contemplated for such use are described in United States Patent No. 2,846,174 and such valves provide a minimum pressure drop and loss of power when applying the brake shoes to the tread of the tires.

A unique safety feature is provided by the brake system of the present invention as best shown in FIG. 4. The cylinder 44 contains a spring 76 which is retained in a coiled state by the air pressure in the system applied through inlet tube 60 against piston 78. The braking system may be utilized by control of the air pressure as previously described with reference to FIG. 5. However, if failure of the primary braking system on a bus or truck occurs, not due to failure of the mechanical parts, but due to a loss of air pressure, then the safety feature comes into play. If the air pressure in the vehicle pressure system falls below a predetermined value, generally about 60 pounds per square inch, the spring overcomes the reduced air pressure on piston 78 and forces the brake shoes 18 to engage the tires 14, stopping the vehicle. The brakes cannot be released until the air pressure is built back up above the predetermined level. This creates a mechanical safety system which absolutely prevents a catastrophe due to air pressure failure.

FIG. 6 shows the brake system of the present invention installed for an automobile, generally designated as 80. A mechanical pivot mounting linkage 82 is provided, which is hand activated by the driver by depressing control handle 84 inside the car. This causes stop 86 to disengage spring 88 causing lever 90 to force brake shoe 92 in engagement with tire 94. Thus a separate auxiliary brake system is provided which can be operated by the driver in an emergency situation.

In the main the present invention finds use when the main brakes on a bus or truck fail to function or become too warm and do not stop wheel rotation, or the main brakes are burned out due to a heavy grade and too frequent application of brake pressure by the operator. The operator may operate the air pressure selection valve to direct air pressure from tank 50 through line 53 to cause brake shoe movement towards the treads of the tires. In the dual wheel system the equalizing tie bar compensates for unequal pressure in the tires so that substantially equal pressure is applied to each wheel tire. The brake shoe by being contoured both transversely and circumferentially to tread form will engage the tread positively when brought into pressure co-engagement therewith without doing damage to the tire treads. It has been found that a runaway truck or bus may be stopped safely and slowly using the auxiliary brake system of the present invention. The present invention is adaptable and may be installed for any form of bus or truck whether it is of the dual wheel type or tandem wheel type as described.

The selector valve described with reference to FIG. 5 or the control of the automobile system of FIG. 6 may be manual as described, pneumatic or solenoid operated. Selector valves of this type are available on the market and hence the valve itself is not detailed.

The reservoir 50 holding air is maintained under pump pressure by the bus or tractor air compressor which also effects holding of safety spring 76 from causing engagement of the brake shoe with the tire.

I claim:
1. In the combination of a vehicle including frame means, ground engaging wheel means and an air pressure brake system for said ground engaging wheel means, the improvement in an auxiliary brake system used with said combination, said improvement comprising:
 (a) brake shoe means selectively engageable with said ground engaging wheels for stopping said vehicle;
 (b) lever means juxtaposed to said brake shoe means;
 (c) pressure control means including a pair of relatively movable members, one of which forms a chamber and the other of which includes a piston slidable in said chamber;
 (d) said brake shoe means and said lever means each having one end pivotally attached to said frame means;
 (e) one of said pressure control means members being pivotally attached to said frame means and the other of said pressure control means members being pivotally attached to that end of said lever means remote from the end thereof attached to said frame means; and
 (f) link means interconnecting said brake shoe means with said lever means;
 (g) said link means having one of its ends pivotally attached to said brake shoe means and having the other of its ends pivotally attached to said lever means intermediate said ends of said lever means;
 (h) said pressure control means being operative to pivot said lever means and thus, through said link means, pivot said brake shoe means to engage the same with said ground engaging wheel means to stop said vehicle.

References Cited

UNITED STATES PATENTS 3,117,653   1/1964   Altherr _____ 188—29

FOREIGN PATENTS 160,633   3/1921   Great Britain.

MILTON BUCHLER, *Primary Examiner.*

THOMAS W. BUCKMAN, *Assistant Examiner.*

U.S. Cl. X.R.

188—57, 106, 151, 167, 170